US012646992B2

(12) United States Patent
Zhu et al.

(10) Patent No.: US 12,646,992 B2
(45) Date of Patent: Jun. 2, 2026

(54) STATOR FOR A ROTATING ELECTRICAL MACHINE

(71) Applicant: Cummins Inc., Columbus, IN (US)

(72) Inventors: Shaohong Zhu, Columbus, IN (US);
Richard Barden, Columbus, IN (US);
Krzysztof Paciura, Columbus, IN (US)

(73) Assignee: Cummins Inc., Columbus, IN (US)

( * ) Notice: Subject to any disclaimer, the term of this patent is extended or adjusted under 35 U.S.C. 154(b) by 220 days.

(21) Appl. No.: 18/200,268

(22) Filed: May 22, 2023

(65) Prior Publication Data

US 2023/0396113 A1      Dec. 7, 2023

(30) Foreign Application Priority Data

May 26, 2022    (GB) ..................................... 2207742

(51) Int. Cl.
H02K 3/28          (2006.01)
H02K 1/14          (2006.01)
(52) U.S. Cl.
CPC ............... H02K 3/28 (2013.01); H02K 1/146 (2013.01)
(58) Field of Classification Search
CPC .......... H02K 1/146; H02K 3/522; H02K 3/28; H02K 3/18
USPC ........................................................ 310/208
See application file for complete search history.

(56) References Cited

U.S. PATENT DOCUMENTS 7,262,538 B2 *   8/2007   Yoneda ................... H02K 3/522
                                                    310/179
7,605,514 B2 *  10/2009   Ito ........................ H02K 21/222
                                                    310/179

| | | | | |
|---|---|---|---|---|
| 8,299,674 | B2 * | 10/2012 | Tanaka ..................... | H02K 3/28 |
| | | | | 310/179 |
| 9,077,216 | B2 * | 7/2015 | Koga ........................ | H02K 3/12 |
| 9,379,585 | B2 | 6/2016 | Marvin et al. | |
| 10,523,074 | B2 * | 12/2019 | Linares .................... | H02K 3/32 |
| 10,547,227 | B2 * | 1/2020 | Hauck ...................... | H02K 3/38 |
| 2002/0148099 | A1 | 10/2002 | Moteurs | |
| 2003/0214196 | A1 | 11/2003 | Cai et al. | |
| 2005/0236922 | A1 * | 10/2005 | Yoneda .................. | H02K 3/522 |
| | | | | 310/179 |
| 2007/0296299 | A1 * | 12/2007 | Qu ........................... | H02K 3/28 |
| | | | | 310/71 |

(Continued)

FOREIGN PATENT DOCUMENTS

EP            2477317 B1      7/2012
JP       2010259189 A      11/2010

(Continued)

OTHER PUBLICATIONS

UK Search Report for GB patent application No. 2207742.4, filed May 26, 2022, mailed Nov. 21, 2022.

(Continued)

*Primary Examiner* — Alex W Mok

(74) *Attorney, Agent, or Firm* — Faegre Drinker Biddle & Reath LLP

(57)                    ABSTRACT

A stator for a rotating electrical machine is disclosed. The stator comprises a plurality of stator teeth wound with stator windings. The stator windings on each tooth comprise at least two parallel conductors which are wound as separate coils. The coils on one tooth are transpose connected with the coils on another tooth. This may help to reduce or eliminate circulating currents, while at the same time minimizing AC losses.

18 Claims, 18 Drawing Sheets

(56)         References Cited

U.S. PATENT DOCUMENTS

2009/0295531 A1 * 12/2009 Silva ..................... H01F 27/346
                                                          336/221
2013/0214632 A1 * 8/2013 Muniz ..................... H02K 3/18
                                                          310/179
2016/0336828 A1 * 11/2016 Miyamoto ............. H02K 3/325
2017/0324294 A1    11/2017 Schulz et al.
2018/0342914 A1 * 11/2018 Saito ..................... B60L 15/007
2020/0358345 A1 * 11/2020 Gbadeyan ................ H02K 1/27

FOREIGN PATENT DOCUMENTS

JP          2013026589 A      2/2013
WO          2022052526 A1     3/2022

OTHER PUBLICATIONS

Zhu, Shaohong, "Application of Flat Rectangular Wire Concen-
trated Winding for AC loss Reduction in Electrical Machines" 2021
IEEE Energy Conversion Congress and Exposition (ECCE).

* cited by examiner

Phase A

Phase A, B, C

Phase A

STATOR FOR A ROTATING ELECTRICAL MACHINE

CROSS-REFERENCE TO RELATED APPLICATION

The present application claims the benefit of U.K. Patent Application No. 2207742.4, filed May 26, 2022, the disclosure of which is incorporated herein by reference in its entirety for all purposes.

FIELD OF THE DISCLOSURE

The present disclosure relates to a stator for a rotating electrical machine, and in particular a stator with a winding configuration that can help to reduce AC losses. The present disclosure has particular, but not exclusive, application in motor/generators for automotive applications.

BACKGROUND

Rotating electrical machines, such as motors and generators, comprise a rotor and a stator separated by an air gap. In one known stator design, the stator comprises a stator core with a plurality of teeth extending radially inwards. The teeth define a plurality of slots for accommodating stator windings. During manufacture, the stator windings may be wound into the slots in situ, or else pre-formed coils may be slid onto the teeth. Typically, random windings with multiple round stranded wires are used.

Increasing demands for weight and volume reduction, particularly in automotive applications, have prompted efforts to operate electrical machines at higher speeds and higher electrical frequencies. However, this may lead to increased AC losses in the stator windings. The AC losses are due amongst other things to phenomena known as the skin effect and the proximity effect. The AC losses may reduce the efficiency of the machine and create challenges in terms of heat dissipation and overheating of the machine.

It has been proposed to use flat rectangular conductors to replace the conventional random wires in low voltage permanent magnet machines. The flat rectangular conductors have a cross section with a relatively high aspect ratio. This may help to reduce AC losses, by reducing the influence of the skin effect.

The flat rectangular conductors may be wound into a coil for insertion onto a stator tooth. However, it may be necessary for each coil to comprise two or more conductors connected electrically in parallel, to keep the cross section of the conductors sufficiently small to minimize the skin effect while also keeping the current density within desired limits. This may lead to circulating currents between the parallel conductors, particularly in higher frequency machines. The circulating currents may in turn contribute to AC losses in the windings.

It would therefore be desirable to provide a stator for a rotating electrical machine in which AC losses due to the skin effect and/or the proximity effect can be minimized, while at the same time minimizing AC losses to due circulating currents between parallel conductors.

SUMMARY

According to one aspect of the present disclosure there is provided a stator for a rotating electrical machine, the stator comprising a plurality of stator teeth wound with stator windings, wherein:

the stator windings on each tooth comprise at least two parallel conductors; and the parallel conductors on one tooth are transpose connected with the parallel conductors on another tooth.

The present disclosure may provide the advantage that, by transpose connecting parallel conductors on one tooth with parallel conductors on another tooth, it may be possible to achieve a better balance between the impedances of the two parallel paths. This may help to reduce or eliminate the circulating current, while at the same time minimizing AC losses due to the skin effect and/or the proximity effect.

By transpose connected, it may be meant that conductors in different positions on two teeth are connected electrically in series. For example, the windings on each tooth may comprise a first conductor in a first position relative to the tooth and a second conductor in a second position relative to the tooth, and a first conductor in a first position on one tooth may be connected in series with a second conductor in a second position on another tooth, and vice versa.

The two parallel conductors may be connected electrically in parallel, such that an electrical current flowing through one conductor will also flow in parallel through the other conductor. Thus, the conductors may be electrically connected together at one end. In this case, the other ends of the conductors may be used to transpose connect the conductors with corresponding parallel conductors on another tooth. Each conductor on one tooth may be connected in series with a conductor on another tooth to form a plurality of parallel paths. By forming a plurality of parallel paths, the cross-sectional area of the conductors may be reduced, thereby helping to reduce AC losses due to the skin effect.

The conductors may be connected such that each parallel path has substantially the same impedance. This may help to minimize circulating currents between the parallel paths, thereby helping to reduce AC losses.

The teeth whose parallel conductors are transposed connected may be of the same phase. Thus, two teeth (or more) of the same phase may have transpose connected parallel conductors. In one embodiment, two or more adjacent teeth may be of the same phase, in which case the parallel conductors of two or more adjacent teeth of the same phase may be transpose connected. In another embodiment, teeth of the same phase may be distributed about the stator, in which case the parallel conductors of two or more distributed teeth of the same phase may be transpose connected.

In general, the parallel conductors may comprise any suitable electrical conductor, such as electrical wire, and may have any appropriate cross-section, such as round or any other shape. However, in an embodiment of the disclosure, each of the conductors is in the form of a rectangular wire, that is, a wire having a rectangular cross-section. In this case, the wire may have a depth (in a radial direction) which is less than its width (in a circumferential direction). This may help to reduce skin effect losses for a wire with a given cross-sectional area. Furthermore, rectangular wires may facilitate assembly and may help with the slot fill factor.

The wire may be a flat rectangular wire, that is, a wire with a relatively high aspect ratio (ratio of width to depth). For example, the wire may have an aspect ratio of at least 2:1, 3:1, 4:1 or 5:1, or any other appropriate value.

The conductors may be wound into coils. Thus, the windings on each tooth may comprise at least two coils of conductors. Each coil may comprise a single conductor, such as a rectangular wire. The coils may be pre-formed and may be arranged to be slid onto the teeth, which may facilitate assembly. Alternatively, the coils may be wound onto the teeth in situ. Each coil may comprise a conductor which is connected in parallel with that of the other coil or coils on the same tooth. Thus, the coils on one tooth may be transpose connected with the coils on another tooth.

Each coil may comprise a plurality of turns, and each turn may comprise a single conductor. For example, where the conductors are rectangular wires, each turn may comprise a single rectangular wire. In this case, the thickness of the coil (from an inside surface to an outside surface) may be equivalent to the width of the rectangular wire. This may help to maximize the cross-sectional area of the wire, thereby helping to minimize current density, while at the same time helping to reduce skin effect losses.

Each of the coils may comprise an input terminal and an output terminal. In this case, an output terminal on one coil may be connected to an input terminal on another coil using a connector. The connector may be, for example, a jump lead, or a strip of metal, or a connection ring, or any other suitable type of connector. Thus, the terminals may be used to transpose connect the coils. This may facilitate connection of the stator windings in the appropriate configuration.

The windings on each tooth may comprise at least two coils in different positions on the tooth, and the coils on one tooth may be transpose connected with the corresponding coils on another tooth (for example, belonging to the same phase). For example, a coil in a first position on one tooth may be connected in series with a coil in a second position on another tooth, and vice versa. This may help to balance the impedances, thereby reducing AC losses due to circulating currents.

In one embodiment, the windings on each tooth comprise a radially outwards coil and a radially inwards coil (that is, two coils sitting on the tooth adjacent to each other in a radial direction). In this case, a radially outwards coil on one tooth may be connected in series with a radially inwards coil on another tooth, and vice versa.

In one embodiment, the coils on a tooth comprise conductors of the same size (that is, the same cross-sectional area). However, in another embodiment, the coils have conductors of a different size. As an example, where each tooth comprises a radially outwards coil and a radially inwards coil, one of the coils may have a larger conductor than the other coil. For example, each coil may comprise a rectangular wire, and the rectangular wire in one of the coils may be wider than the rectangular wire in the other coil. In this case, each turn of a coil may comprise a single rectangular wire. The coil with a larger conductor may be provided on a part of the tooth where the stator slot is wider (which is typically inside the slot away from the slot opening). Thus, in the case of an outer stator, the radially outwards coil may have a larger conductor than the radially inwards coil. In the case of an inner stator, the radially inwards coil may have a larger conductor than the radially outwards coil. This embodiment may allow more of the slot to be filled and may help with heat transfer from the coils through the stator.

In another embodiment, the windings on each tooth comprise an inner coil and an outer coil, with the inner coil nested inside the outer coil. In this case, the inner and outer coils on one tooth may be transpose connected with the inner and outer coils on another tooth (for example, of the same phase).

In another embodiment, the windings on each tooth comprise two radially outwards coils, one nested inside the other, and one radially inwards coil. In this case, the coils of three teeth belonging to the same phase may be transpose connected. For example, an inner, radially outwards coil on a first tooth may be connected in series with an outer, radially outwards coil on a second tooth and with a radially inwards coil on a third tooth. This may allow three parallel paths to be formed, each with substantially the same impedance. This embodiment may allow more of the slot to be filled and may help with heat transfer from the coils through the stator.

In a further embodiment, the windings on each tooth comprise two radially outwards coils, one nested inside the other, and two radially inwards coils, one nested inside the other. In this case, the coils of two teeth belonging to the same phase may be transpose connected. For example, an inner, radially outwards coil on a first tooth may be connected in series with an outer, radially inwards coil on the first tooth; an outer, radially outwards coil on a second tooth; and an inner, radially inwards coil on the second tooth. This may allow two parallel paths to be formed, each with substantially the same impedance. If desired, the radially outwards coils may have larger conductors (for example, rectangular wires with a larger width) than the radially inwards coils.

It will be appreciated that, in general, the windings on each tooth may comprise any appropriate number of coils in any appropriate configuration, and the coils of any number of teeth of the same phase may be transpose connected.

In any of the above arrangements, the stator may comprise an annular stator core, and the plurality of teeth may extend radially from the annular stator core. In one embodiment the stator is an outer stator, in which case the teeth may extend radially inwards. In other embodiments, the stator is an inner stator, in which case the teeth may extend radially outwards. The teeth may define slots which accommodate the stator windings.

According to another aspect of the disclosure there is provided a rotating electrical machine comprising a stator in any of the forms described above and a rotor arranged to rotate relative to the stator about a rotor axis. The rotor may rotate inside the stator or outside the stator. The rotor may comprise a plurality of permanent magnets.

Corresponding methods may also be provided. Thus, according to another aspect of the disclosure there is provided a method of winding a stator for a rotating electrical machine, the stator comprising a plurality of stator teeth, the method comprising:

winding each tooth with at least two parallel conductors; and transpose connecting the parallel conductors on one tooth with the parallel conductors on another tooth.

According to another aspect of the present disclosure there is provided a stator for a rotating electrical machine, the stator comprising a plurality of stator teeth wound with stator windings. The stator windings on each tooth of the plurality of stator teeth comprise at least two parallel conductors. The parallel conductors on one tooth of the plurality of stator teeth are transpose connected with the parallel conductors on another tooth of the plurality of stator teeth. In some examples, the windings on each tooth comprise a first conductor in a first position relative to the tooth and a second conductor in a second position relative to the tooth, and the first conductor on the one tooth is connected in series with the second conductor on the another tooth, and vice versa.

In some examples, each conductor of the at least two parallel conductors on the one tooth is connected in series with another conductor of the at least two parallel conductors on the another tooth to form a plurality of parallel paths. In some examples, the conductors are connected such that each parallel path of the plurality of parallel paths has substantially the same impedance. In some examples, the conductors are connected so as to minimize circulating currents between the parallel paths.

In some examples, the one tooth and the another tooth are of the same phase. In some examples, each conductor of the at least two parallel conductors is a wire with a rectangular cross-section. In some examples, the rectangular cross-section of the wire has an aspect ratio of at least 2:1.

In some examples, the windings on each tooth comprise at least two coils of conductors. In some examples, each coil of the at least two coils comprises a plurality of turns, and each turn of the plurality of turns comprises a single rectangular wire. In some examples, each coil of the at least two coils comprises an input terminal and an output terminal, and the output terminal on one coil of the at least two coils is connected to the input terminal on another coil of the at least two coils using a connector.

In some examples, the windings on each tooth comprise at least two coils in different positions on the tooth, and the coils on the one tooth are transpose connected with the corresponding coils on the another tooth. In some examples, each tooth is wound with a radially outwards coil and a radially inwards coil, and the radially outwards coil on the one tooth is connected in series with the radially inwards coil on the another tooth, and vice versa. In some examples, each coil of the at least two coils comprises a rectangular wire, and the rectangular wire in the radially outwards coil is wider than the rectangular wire in the radially inwards coil. In some examples, the windings on each tooth comprise an inner coil and an outer coil, and the inner coil is nested inside the outer coil. In some examples, the windings on each tooth comprise two radially outwards coils, one nested inside the other, and one radially inwards coil. In some examples, the two radially outwards coils and the one radially inwards coil of three teeth of the plurality of stator teeth belonging to the same phase are transpose connected. In some examples, the windings on each tooth comprise two radially outwards coils, one nested inside the other, and two radially inwards coils, one nested inside the other.

According to another aspect of the present disclosure there is provided a stator for a rotating electrical machine, the stator comprising a plurality of stator teeth wound with stator windings. The stator windings on each tooth of the plurality of stator teeth comprise a radially inwards coil and a radially outwards coil connected in parallel. The radially inwards coil and the radially outwards coil on one tooth of the plurality of stator teeth are transpose connected with the corresponding radially inwards coil and the corresponding radially outwards coil on another tooth of the plurality of stator teeth.

According to another aspect of the present disclosure there is provided a method of winding a stator for a rotating electrical machine, the stator comprising a plurality of stator teeth, the method comprising: winding each tooth of the plurality of stator teeth with at least two parallel conductors; and transpose connecting the parallel conductors on one tooth of the plurality of stator teeth with the parallel conductors on another tooth of the plurality of stator teeth.

Features of one aspect of the disclosure may be provided with any other aspect. Apparatus features may be provided with method aspects and vice versa.

In the present disclosure, terms such as "radially", "axially" and "circumferentially" are generally defined with reference to the axis of rotation of the electrical machine, unless the context implies otherwise.

BRIEF DESCRIPTION OF THE DRAWINGS

Embodiments of the present disclosure will now be described, purely by way of example, with reference to the accompanying drawings, in which.

DETAILED DESCRIPTION OF EMBODIMENTS OF THE DISCLOSURE

Figure 1:
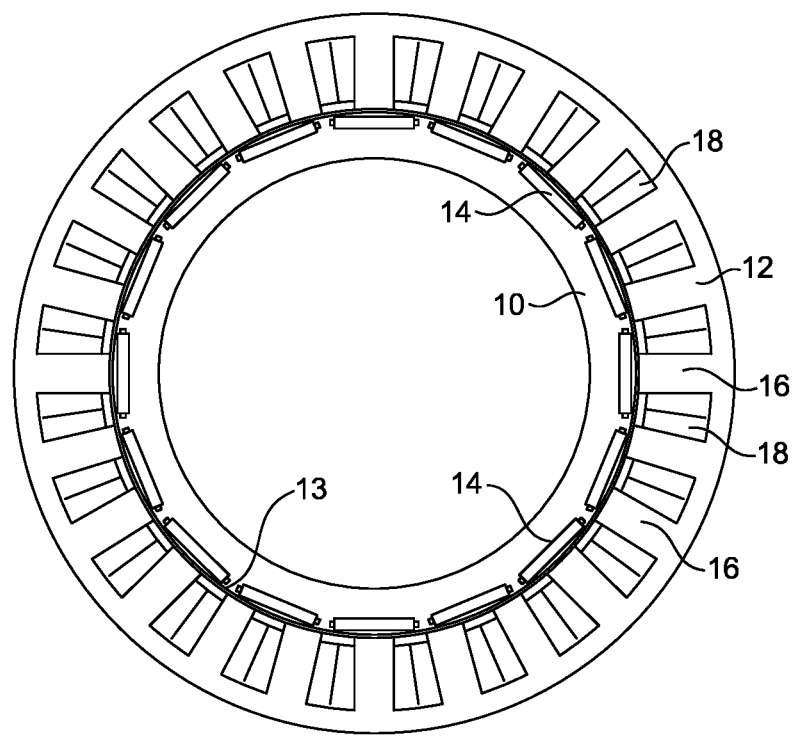
FIG. 1 is a cross-section through part of a known rotating electrical machine.

FIG. 1 is a cross-section through part of a known rotating electrical machine. Referring to FIG. 1, the machine comprises a rotor 10 inside a stator 12, with an airgap 13 between the two. The rotor 10 comprises a rotor core with embedded permanent magnets 14. The stator 12 comprises an annular stator core with a plurality of teeth 16 which project radially inwards. The teeth 16 define slots which accommodate stator windings 18. In this example, the teeth 16 have parallel sides, and thus the width of the slots increases with increasing distance from the axis of rotation. The stator windings are in the form of coils located on the teeth 16. The coils may be wound onto the teeth in situ, or else pre-formed coils may be slid onto the teeth. In the example shown, the stator comprises twenty-four stator teeth and the rotor comprises sixteen permanent magnets. However, it will be appreciated that any appropriate number of stator teeth and rotor magnets may be provided.

In operation, the rotor 10 rotates inside the stator 12 about a central axis of rotation. A magnetic flux developed by the permanent magnets 14 crosses the airgap 13 and combines with stator windings 18. In the case of motor operation, a varying electrical current is supplied to the stator windings 18 and the thus generated magnetic field causes the rotor to rotate. In the case of generator operation, the rotor is rotated by a prime mover and the rotating magnetic field developed by the permanent magnets 14 causes an electrical current to flow in the stator windings. The stator windings may be, for example, connected to a three-phase inverter. The rotor may be, for example, connected to a vehicle drivetrain. A cooling jacket (not shown) may be provided around the stator for circulating coolant in order to cool the machine.

In this example, the machine is a three-phase fractional slot concentrated winding (FSCW) permanent magnet synchronous machine. Such machines are widely used in automotive applications due to their high efficiency, high torque density, ease of manufacture and fault tolerance capability. However, other types of machine, such as machines with distributed windings and/or a different number of phases, may be used instead.

Electrical machines for automotive applications face increasing demands to operate at higher speeds and higher electrical frequencies in order to achieve weight and volume reductions. However, this may lead to increased AC losses in the stator windings. The AC losses are at least partially caused by phenomena known as the skin effect and the proximity effect. The skin effect loss is associated with the non-uniform current distribution of the AC current flowing in the conductor, while the proximity effect loss is caused by the effect of the alternating field of other nearby conductors. Both loss components exist at the same time, and both affect the machine's efficiency and create localized high conductor temperature, especially at the slot opening area.

A known approach to reducing AC losses is to use windings consisting of multiple thin round wires whose diameter is less than the skin depth. However, while this can help reduce the skin effect loss, significant proximity loss may still exist. This is due in part to strands of wire in different positions within the slot being exposed to different levels of leakage flux. Significant circulating current may be produced in parallel strands within each bundle. The proximity loss can be reduced by using wire with transposed strands, such as Litz wire or wires transposed in end winding connections. However, the higher cost of such wires limits their applications, and the slot fill factor may be negatively affected.

In order to address the above problems, it has been proposed to use flat rectangular wire to replace the traditional random windings with multiple stranded round wires. The flat rectangular wire has a cross section with a relatively high aspect ratio (ratio of width to depth), in order to reduce skin effect losses for a given cross-sectional area. The flat rectangular wire may be pre-formed into coils for insertion onto the stator teeth. In this case, each layer of the coil may comprise a single flat rectangular wire. It has been found that flat rectangular wire windings with a high aspect ratio can help reduce skin effect losses. Therefore, flat rectangular wire windings have been identified as a good solution in terms of reducing winding AC losses.

Figure 2A:
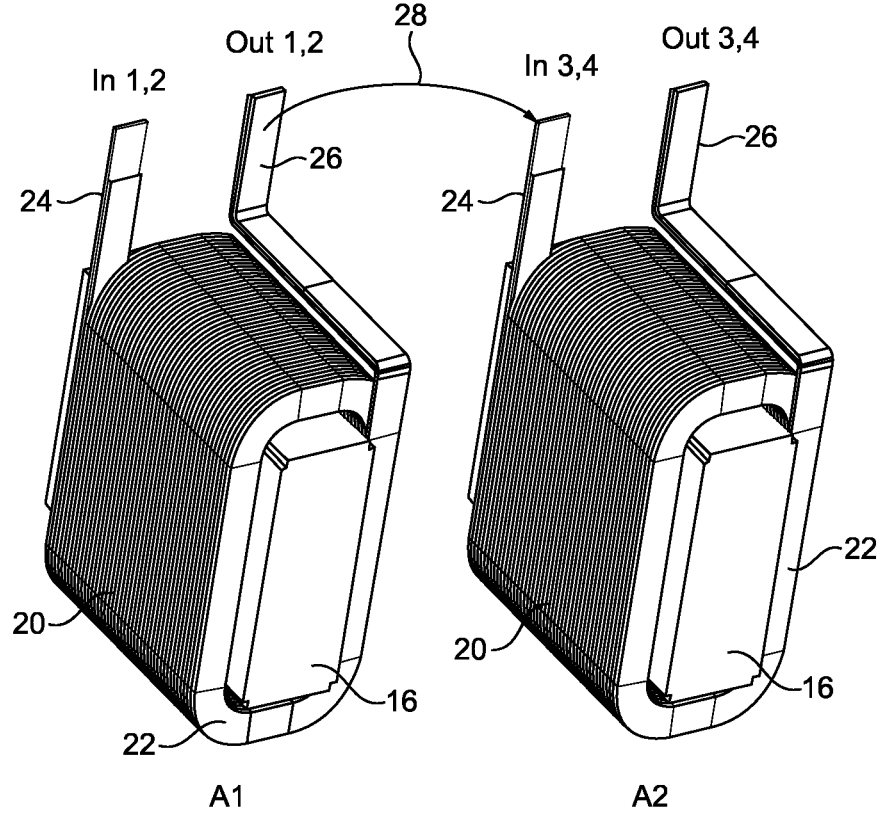
FIGS. 2A and 2B show a previously considered stator winding arrangement.
Figure 2B:
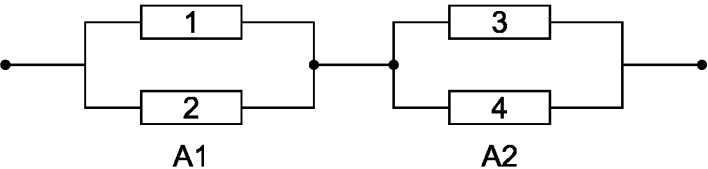

FIGS. 2A and 2B show a previously considered stator winding arrangement s. In FIG. 2A, two adjacent stator teeth 16 belonging to the same phase are shown, each of which is wound with a coil 20 of flat rectangular wire 22. Each coil comprises an input terminal 24 and output terminal 26. The coils 20 are pre-formed and assembled by sliding them onto the teeth 16. Each turn of the coil 20 comprises a single width of flat rectangular wire 22. In order to meet power and speed requirements of the machine while keeping the cross section of the wires 22 sufficiently small, each coil 20 comprises two flat rectangular wires 22 electrically connected in parallel at the terminals 24, 26. In this example, each of the coils 20 is of the same phase. The coils on one tooth 16 are connected in series with the coils on the other tooth by a jump lead 28.

Figure 3:
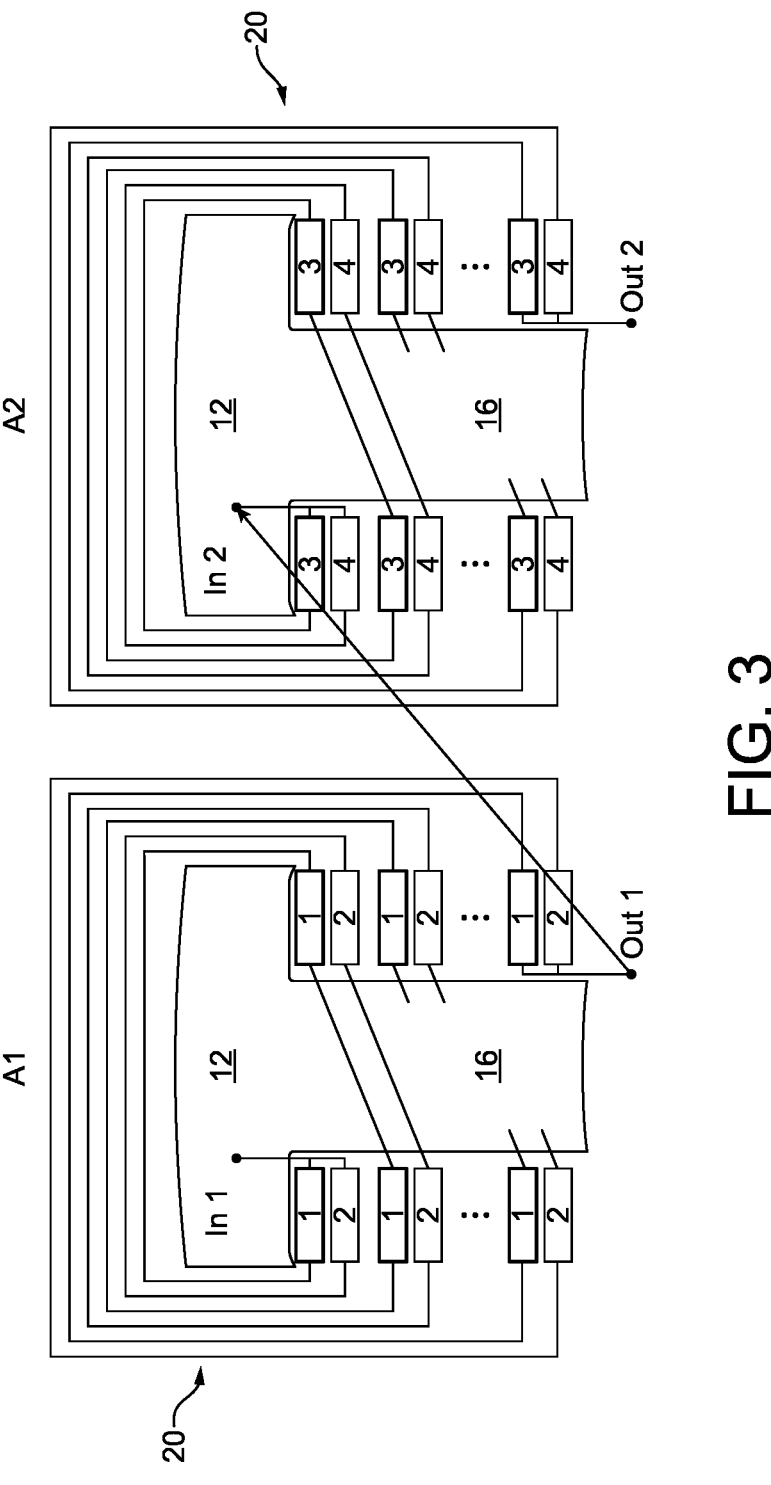
FIG. 3 shows schematically the winding arrangement of FIG. 2A in more detail.

FIG. 3 shows schematically the winding arrangement of FIG. 2A in more detail. Referring to FIG. 3, it can be seen that each coil 20 comprises two parallel wires. The wires spiral around the stator tooth 16 and are connected together at each end of the coil. The output of coil A1 is connected to the input of coil A2. FIG. 2A illustrates the overall winding arrangement of FIGS. 2A and 3.

The arrangement shown in FIGS. 2 to 3 can provide advantages in terms of reducing AC losses and ease of manufacture. However, it has been found that circulating currents may arise between the parallel paths in a coil due to impedance differences between the paths. This is due in part to the fact that the magnetic flux is different in different parts of the slot. For low voltage and high frequency machines, the circulating currents among parallel wires can be large, potentially leading to significant winding AC losses.

Embodiments of the disclosure propose the use of transposed flat rectangular wire terminal connections to reduce or eliminate the circulating AC current by balancing the impedance of parallel stranded wires.

In one embodiment, each tooth-wound coil with n parallel wires is separated into n sub-coils, where each sub-coil includes a single wire. Their terminals are then transposed connected with sub-coils in another tooth belonging to same phase to form different parallel paths. The aim is to ensure that the impedance of each parallel path is substantially the same. In this case, the circulating currents within parallel wires can be reduced or eliminated.

Figure 4:
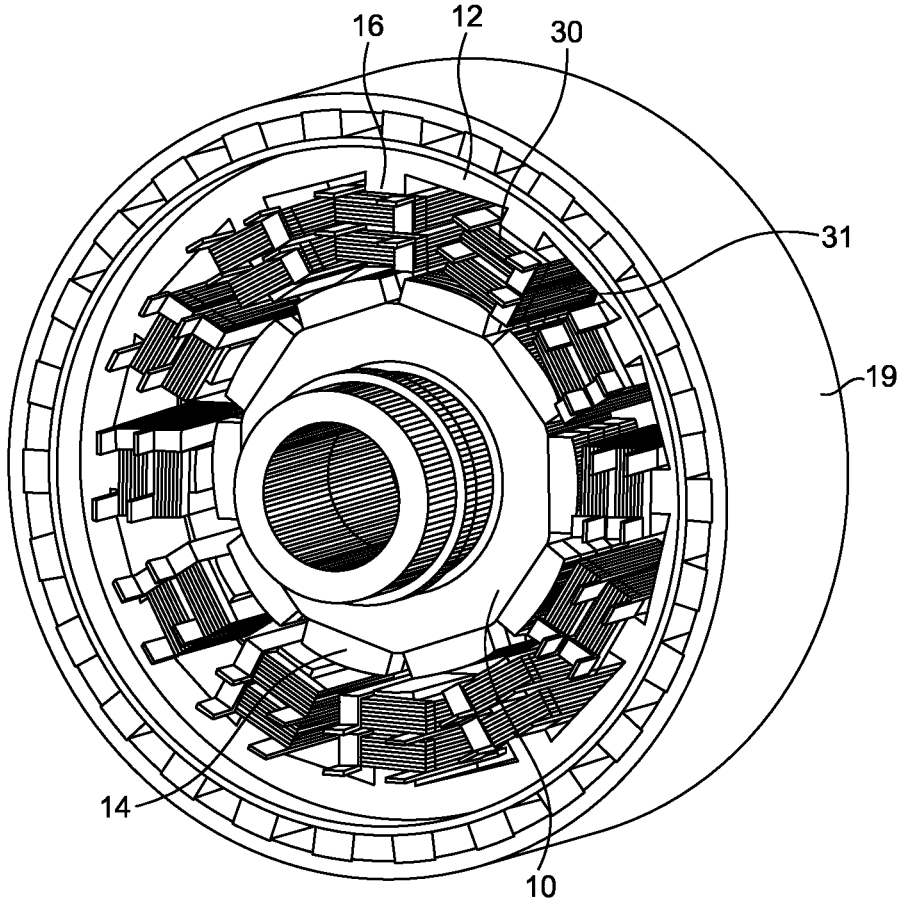
FIG. 4 shows part of a rotating electrical machine in an embodiment of the disclosure.

FIG. 4 shows part of a rotating electrical machine in an embodiment of the disclosure. Referring to FIG. 4, the machine comprises a rotor 10 inside a stator 12, with an airgap between the two. The rotor 10 comprises a rotor core with permanent magnets 14. The stator 12 comprises an annular stator core with a plurality of teeth 16 which project radially inwards. Each stator tooth 16 is wound with two coils 30, 31 of flat rectangular wire 32. A first, radially outwards coil 30 is located on a radially outwards end of the tooth 16, towards the stator core. A second, radially inner coil 31 is located on the radially inwards end of the tooth 16, towards the slot opening. A cooling jacket 19 is provided around the stator 12 for circulating coolant in order to cool the machine.

Figure 5:
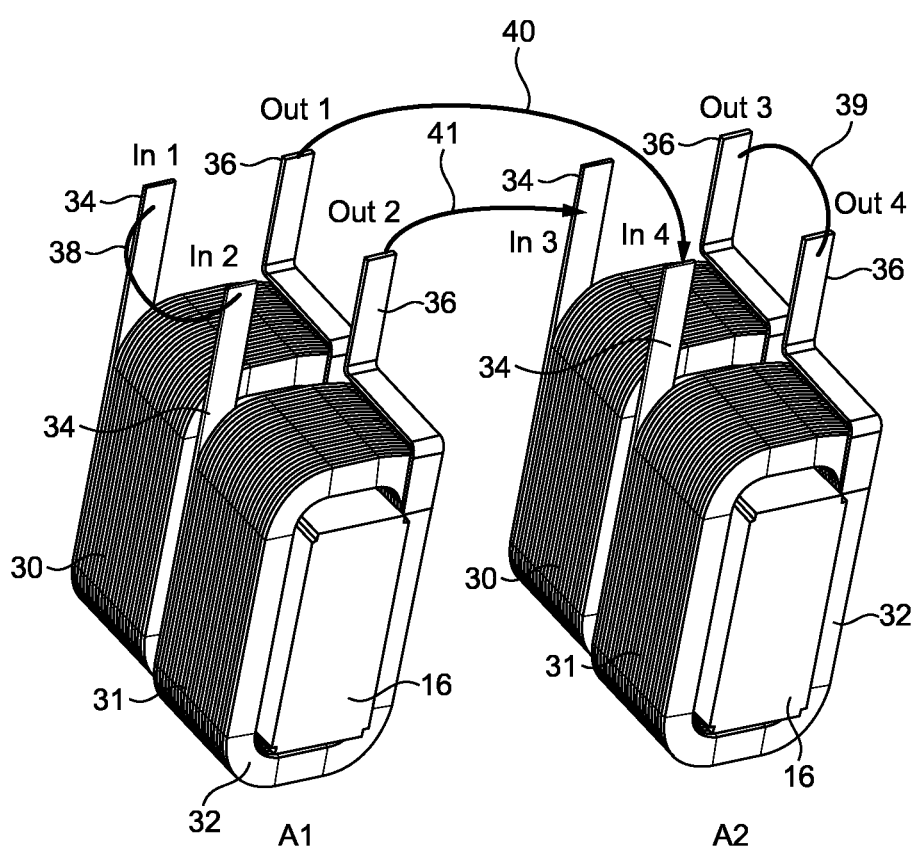
FIG. 5 shows a stator winding arrangement in an embodiment of the disclosure.

FIG. 5 shows a stator winding arrangement in an embodiment of the disclosure. In FIG. 5, two adjacent stator teeth 16 are shown. For simplicity, only two teeth are shown, but it will be appreciated that in practice a plurality of stator teeth are provided circumferentially around an annular stator core in a similar way to arrangement of FIG. 4. Referring to FIG. 5, each stator tooth 16 is wound with two coils 30, 31 of flat rectangular wire 32. A first, radially outwards coil 30 is located on a radially outwards end of the tooth 16, towards the stator core. A second, radially inner coil 31 is located on the radially inwards end of the tooth 16, towards the slot opening.

Each coil 30, 31 comprises multiple turns of a single flat rectangular wire 32. The flat rectangular wire may be made from, for example, enamelled copper, aluminium wire, or any other suitable material. In this embodiment, each of the coils 30, 31 is substantially the same. The thickness of a coil 30, 31 (from its inside surface to its outside surface) is equivalent to the width of the wire 32. The depth of the coil (in a radial direction) is equivalent to the depth of the wire multiplied by the number of turns. The wire has a cross section with a relatively high aspect ratio (the ratio of its width to its depth). For example, in one embodiment the width of the wire may be around 8 mm and the depth of the wire may be around 1.5 mm, although it will be appreciated that other values may be used instead, depending for example on the size of the machine.

Each coil 30, 31 comprises an input terminal 34 and an output terminal 36. In this example, the input terminal 34 of each coil 30, 31 is located at one side of the coil and the output terminal 36 is located at the other side, circumferentially. The input terminal 34 extends in an axial direction at the radially outwards end of the coil. The output terminal 36 is bent back in a radial direction across the depth of the coil, before extending axially outwards. This allows the input and output terminals 34, 36 to be located at approximately the same radius on the machine, while being spaced apart circumferentially, which may facilitate interconnectivity. The coils 30, 31 are pre-formed and assembled by sliding them onto the teeth 16. In FIG. 5, each of the coils 30, 31 is of the same phase.

In the arrangement of FIG. 5, the input terminals 34 of the two coils 30, 31 on the first tooth A1 are connected together by a jump lead 38. Likewise, the output terminals 36 of the two coils 30, 31 on the second tooth A2 are connected together by a jump lead 39. However, in this embodiment, the output terminal 36 of the first, radially outwards coil 30 on the first tooth A1 is connected to the input terminal 34 of the second, radially inwards coil 31 on the second tooth A2 by a jump lead 40. Furthermore, the output terminal 36 of the second, radially inwards coil 31 on the first tooth A1 is connected to the input terminal 34 of the first, radially outwards coil 30 on the second tooth A2 by a jump lead 41. As a consequence, a radially outwards coil 30 on one tooth is connected in series with a radially inwards coil 31 on the other tooth, and the two pairs of series connected coils are connected in parallel. Thus, the terminals of the coils are used to transpose connect the coils on one tooth with the coils on the adjacent tooth belonging to same phase.

Figures 6, 7:
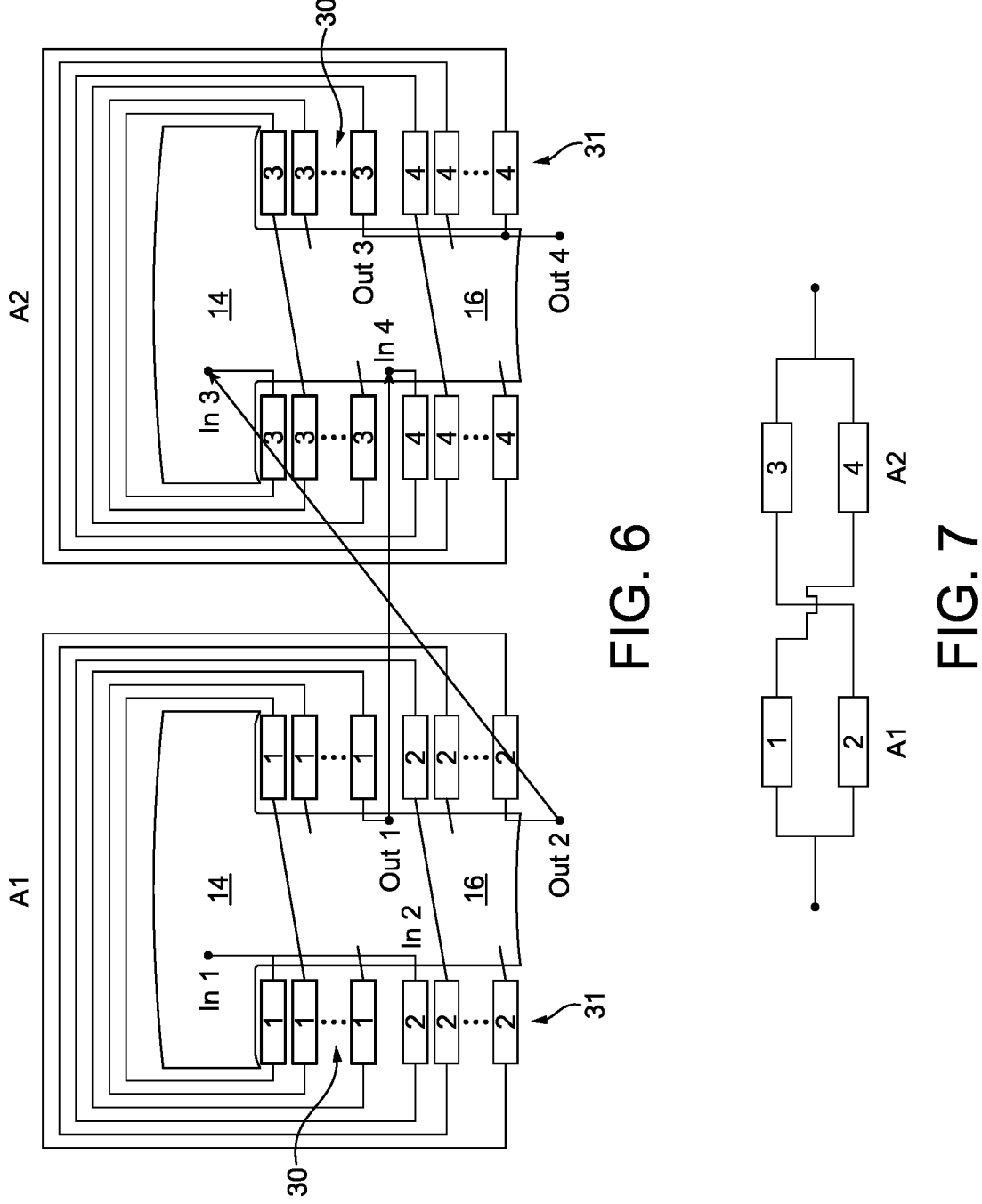
FIG. 6 shows schematically the winding arrangement of FIG. 5 in more detail.
FIG. 7 illustrates the overall winding arrangement of FIGS. 5 and 6.

FIG. 6 shows schematically the winding arrangement of FIG. 5 in more detail. Referring to FIG. 6, it can be seen that each tooth 16 comprises two coils 30, 31, each of which spirals around the tooth. The input terminals of the two coils 30, 31 on the first tooth A1 are connected together to form a common input terminal. The output terminal of the first coil 30 on the first tooth A1 is connected to the input terminal of the second coil 31 on the second tooth A2. The output terminal of the second coil 31 on the first tooth A1 is connected to the input terminal of the first coil 30 on the second tooth A2. The output terminals of the two coils 30, 31 on the second tooth A2 are connected together to form a common output terminal.

FIG. 7 illustrates the overall winding arrangement of FIGS. 5 and 6. As can be seen, the coils on one tooth are transposed connected with the coils on the adjacent tooth belonging to same phase. By transposing the terminal connections of the flat rectangular wires, the two parallel paths are distributed equally between radially inwards and radially outwards parts of the teeth. As a consequence, the two parallel paths experience substantially the same magnetic flux during operation of the machine. This can allow a balanced impedance between the parallel paths to be achieved, reducing or eliminating the circulating current. This in turn may help to improve efficiency and thermal management through a reduction in AC losses and a reduction in temperature rises.

In the arrangement shown in FIGS. 5 to 7, the coils 30 are preformed concentrated coils with flat rectangular wires. In this case, the position of each conductor is known, as well as the relative magnitude of impedance. The transposition can be implemented on the terminal connections using jump wires, or any other appropriate connector. This allows the winding arrangement to be easily implemented.

Figure 8A:
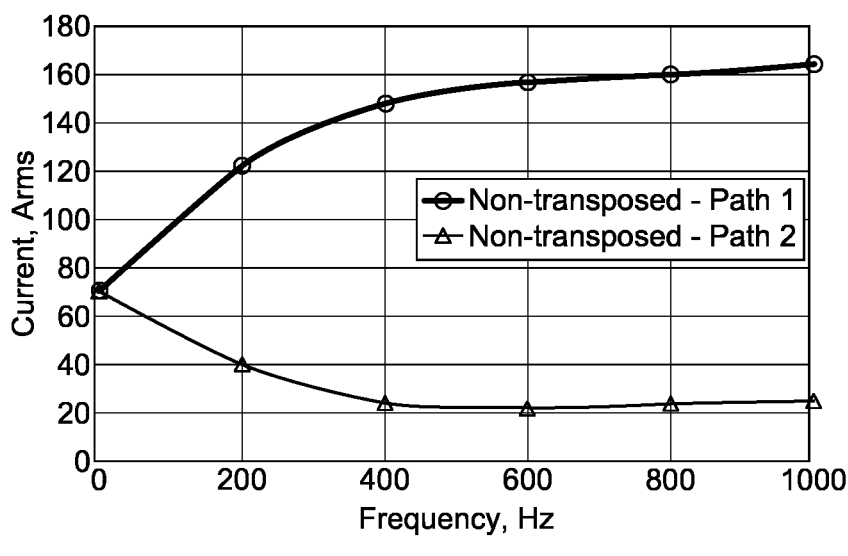
FIGS. 8A and 8B show results of tests carried out on various winding arrangements.
Figure 8B:
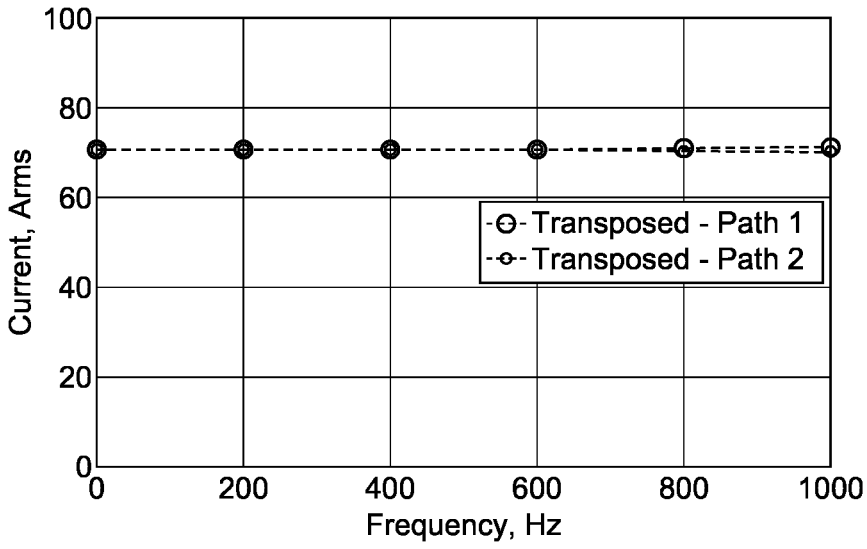

FIGS. 8A and 8B show results of tests carried out on the previously considered winding arrangement of FIG. 2 and the winding arrangement in the embodiment of FIG. 5. FIG. 8A shows the current against frequency for the two parallel paths in the winding arrangement of FIG. 2. It can be seen that, at higher frequencies, the current in path 1 is significantly higher than the current in path 2 due to impedance differences between the two parallel paths. This may lead to circulating currents between the two parallel paths, contributing to AC losses.

FIG. 8B shows the current against frequency for the two parallel paths in the transposed winding arrangement of FIGS. 5 to 7. It can be seen that the current through the two parallel paths is substantially the same at all frequencies. As a consequence, circulating currents between the paths are reduced or eliminated, thereby reducing AC losses.

In the embodiment of FIGS. 5 to 7, a tooth-wound coil with two parallel wires is separated into two sub-coils. Each sub-coil has flat rectangular wire of the same gauge (width). However, in an alternative embodiment, the sub-coils on a tooth have flat rectangular wire with different gauges. This may help to increase the slot fill factor and improve heat transfer.

Figure 9A:
FIGS. 9A and 9B illustrate the separation of a tooth-wound coil with two parallel wires into two sub-coils.
Figure 9B:
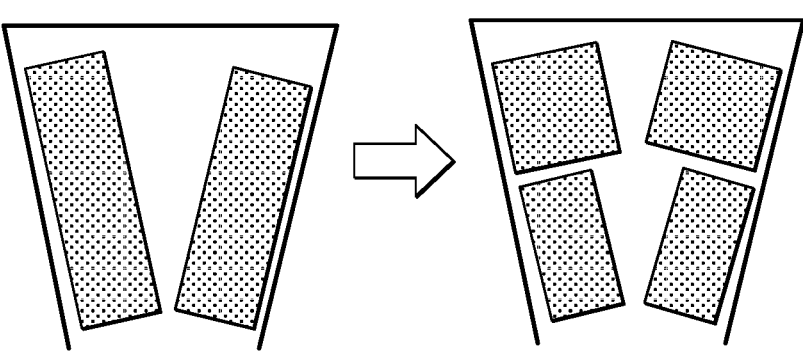

FIGS. 9A and 9B illustrate the separation of a tooth-wound coil with two parallel wires into two sub-coils. In the arrangement of FIG. 9A, the two sub-coils on a tooth have flat rectangular wires of the same gauge. However, in the arrangement of FIG. 9B, the radially outwards coil has a wider gauge than the radially inwards coil. As can be seen from FIG. 9B, by using wire with a wider gauge in the radially outwards coil (where the slot is wider), the slot fill factor can be improved. Furthermore, the contact area between the radially outwards coil and the stator core may be increased, which may help with transfer of heat from the coil to the stator core.

Figure 10:
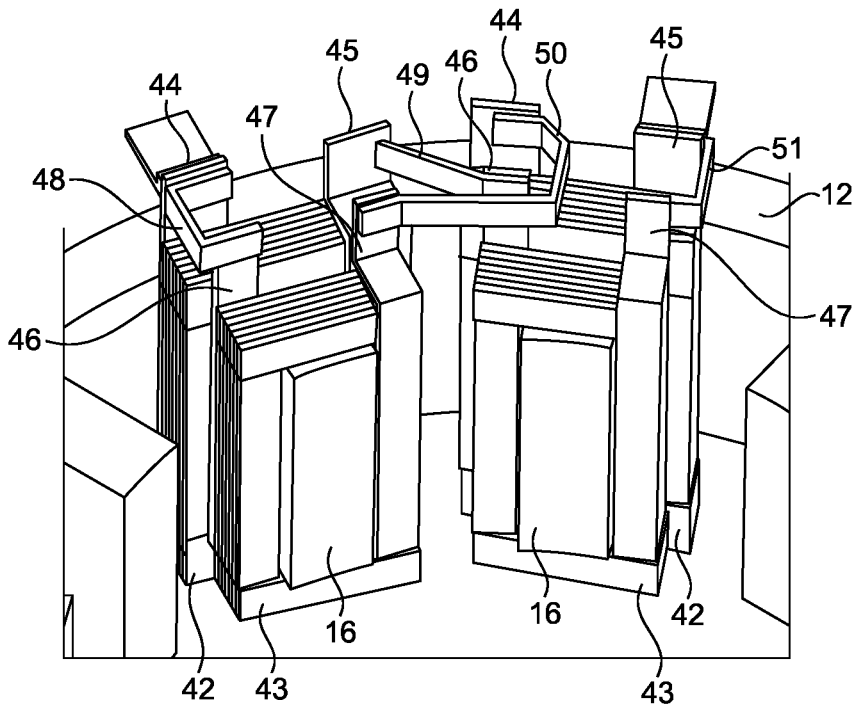
FIG. 10 shows part of a stator in another embodiment of the disclosure.

FIG. 10 shows part of a stator in another embodiment of the disclosure. In this embodiment, the stator windings comprise coils with different wire gauges. Referring to FIG. 10, the stator 12 comprises an annular stator core with a plurality of teeth 16 which project radially inwards. Each stator tooth 16 is wound with two coils 42, 43 of flat rectangular wire. A first, radially outwards coil 42 is located on a radially outwards end of the tooth 16, towards the stator core. A second, radially inwards coil 43 is located on the radially inwards end of the tooth 16, towards the slot opening. Each coil 42, 43 comprises multiple turns of a single flat rectangular wire. The coils 42, 43 are pre-formed and assembled by sliding them onto the tooth 16. Each of the coils 42, 43 on the two adjacent teeth is of the same phase.

In FIG. 10, each radially outwards coil 42 comprises an input terminal 44 and an output terminal 45, and each radially inwards coil 43 comprises an input terminal 46 and an output terminal 47. The input terminals 44, 46 are located on the opposite side of the coil from the output terminals, circumferentially. The input terminal 44, 46 of each coil extends in an axial direction at the radially outwards end of the coil. The output terminal 45, 47 is bent back in a radial direction across the depth of the coil, before extending axially outwards. Thus, the input and output terminals of each coil are located at approximately the same radius but are spaced apart circumferentially.

The input terminals 44, 46 of the two coils 42, 43 on the first tooth are connected together by a connector 48. The output terminal 45 of the first, radially outwards coil 42 on the first tooth is connected to the input terminal 46 of the second, radially inwards coil 43 on the second tooth by a connector 49. The output terminal 47 of the second, radially inwards coil 43 on the first tooth 16 is connected to the input terminal 44 of the first, radially outwards coil 42 on the second tooth by a connector 50. The output terminals of the two coils 42, 43 on the second tooth are connected together by a connector 51. Thus, the terminals of the coils on one tooth are transposed connected with the coils on the adjacent tooth belonging to same phase.

In the arrangement of FIG. 10, the first, radially outwards coil 42 comprises a flat rectangular wire of a higher gauge (width) than the second, radially inwards coil 43. Since the first, radially outwards coil 42 is deeper inside the stator slot (where the slot is wider), this allows more of the slot to be filled by the coil than would otherwise be the case. Furthermore, a larger part of the first, radially outwards coil 42 is in contact with the stator core. This can allow better transfer of heat from the coil 42 to a cooling jacket via the stator 12.

The connectors 48, 49, 50, 51 in FIG. 10 may be any suitable electrical conductors, such as strips of copper. In the example shown, the connectors are bent so as to connect the appropriate terminals while avoiding contact with the other terminals. The connectors may be for example spot welded to the terminals. If desired, electrical insulation may be applied to the outside of the connectors. Alternatively, any other suitable connectors, such as jump leads or a connection ring, may be used instead or as well.

Figure 11:
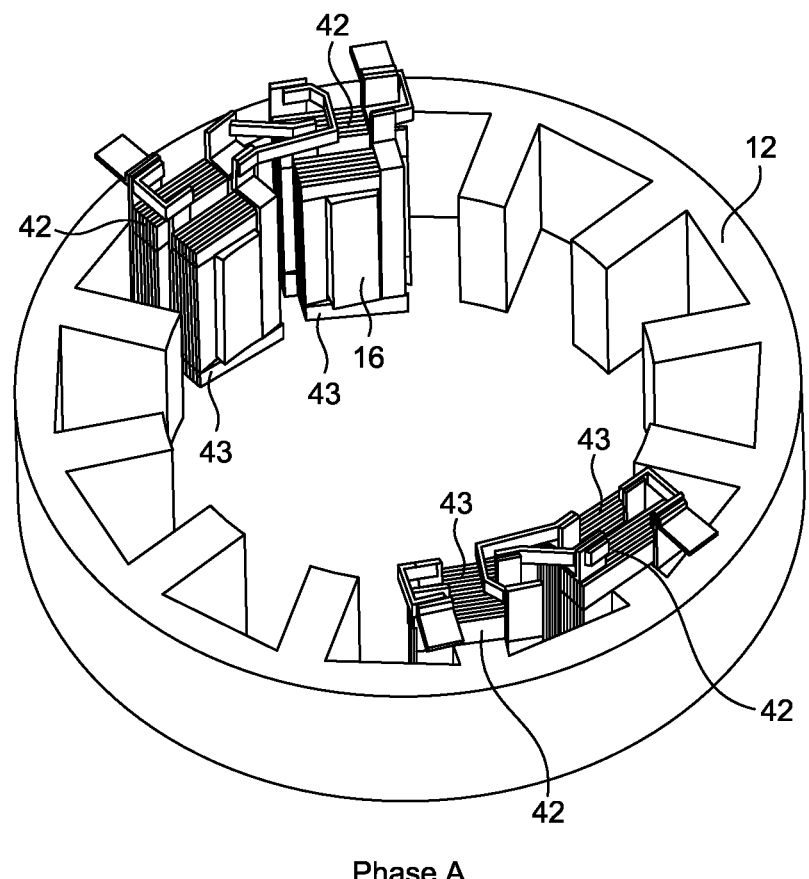
FIG. 11 shows a partially assembled stator in one possible configuration.

FIG. 11 shows a partially assembled stator in one possible configuration. In this configuration, the stator is for a three-phase, 12 slot, 10/14 pole machine (10 or 14 rotor poles). In FIG. 11, the coils of one phase (Phase A) are shown on the teeth. Four coils 42, 43 are provided on two adjacent teeth 16 on one side of the machine. The coils 42, 43 are transpose connected in the manner described above with reference to FIG. 10. Four transpose connected coils 42, 43 of the same phase are provided on two adjacent teeth 16 on the opposing side (180° circumferentially) of the stator.

Figure 12:
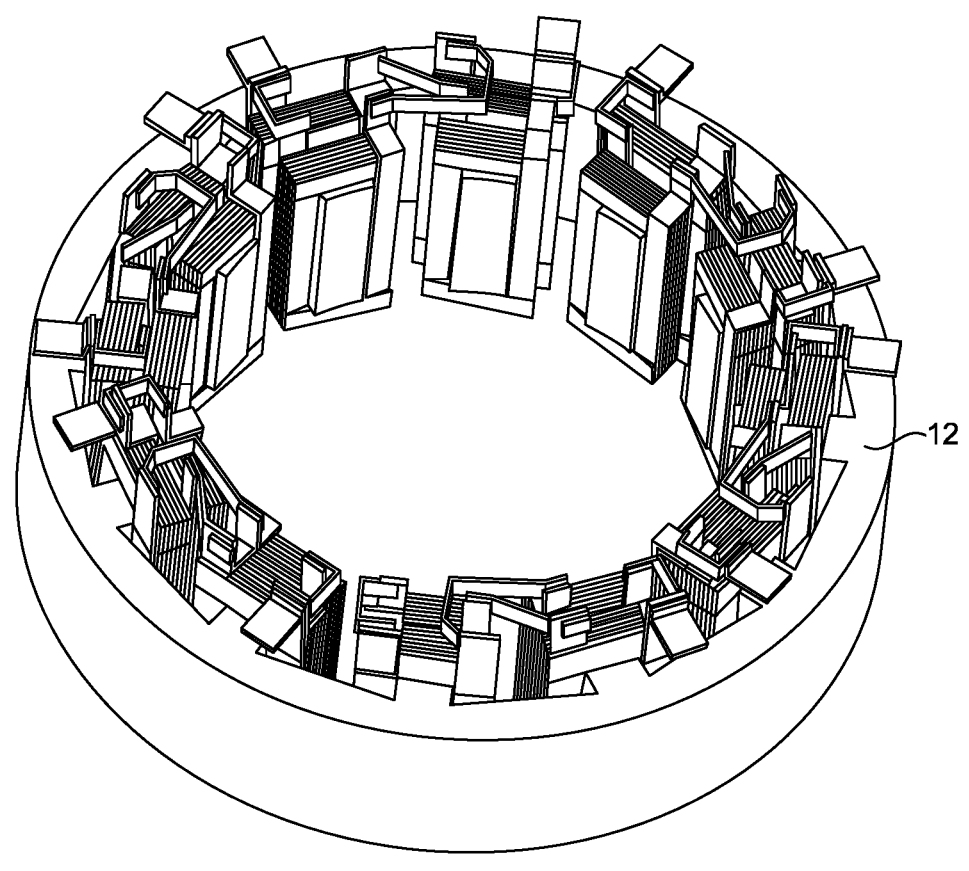
FIG. 12 shows the stator of FIG. 11 with the coils of three phases inserted onto the teeth.

FIG. 12 shows the stator of FIG. 11 with the coils of all three phases (Phases A, B and C) inserted onto the teeth. In this configuration, two adjacent teeth belonging to one phase are on one side of the stator and two adjacent teeth belong to the same phase are on the opposing side of the stator. Successive pairs of teeth in a circumferential direction belong to different phases.

Figure 13:
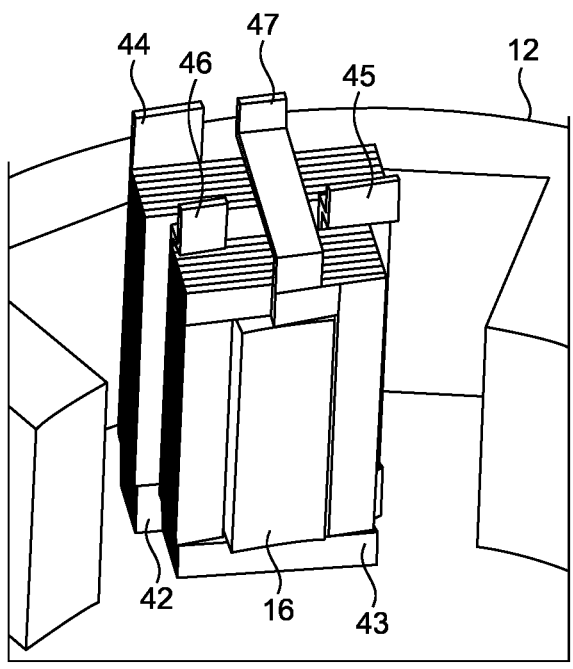
FIG. 13 shows part of a stator in another embodiment.

FIG. 13 shows part of a stator in another embodiment. In this embodiment, the stator windings comprise coils with different flat rectangular wire gauges, in a similar manner to that described above with reference to FIG. 10. However, in the arrangement of FIG. 13, each adjacent stator tooth belongs to a different phase.

Referring to FIG. 13, each stator tooth 16 is wound with two coils 42, 43 of flat rectangular wire. A first, radially outwards coil 42 is located on a radially outwards end of the tooth 16, towards the stator core. A second, radially inwards coil 43 is located on the radially inwards end of the tooth 16, towards the slot opening. Each coil 42, 43 comprises multiple turns of a single flat rectangular wire. The first, radially outwards coil 42 comprises a flat rectangular wire of a higher gauge (width) than the second, radially inwards coil 43.

The radially outwards coil 42 comprises an input terminal 44 and an output terminal 45. The input terminal 44 is located on the opposite side of the coil from the output terminal 45, circumferentially. In this embodiment, the output terminal 45 of the radially outwards coil extends in an axial direction and is not bent back across the coil. Thus, the output terminal 45 of the first coil 42 is at a different radius from the input terminal 44. The radially inwards coil 43 comprises an input terminal 46 and an output terminal 47. The input terminal 46 extends in an axial direction at the radially outwards end of the coil. However, the output terminal 47 is bent back and extends in a radial direction across the depth of the both the second coil 43 and the first coil 42, before extending axially outwards. The output terminal 47 is located at the centre of the coil, circumferentially, and passes between the input terminal 46 of the second coil 43 and the output terminal 45 of the first coil 42. Thus, output terminal 47 of the second coil 43 is located at approximately the same radius as the input terminal 44 of the first coil 42, and the output terminal 45 of the first coil 42 is located at approximately the same radius as the input terminal 46 of the second coil 43. This may facilitate connection of the coils in the manner described below.

Figure 14:
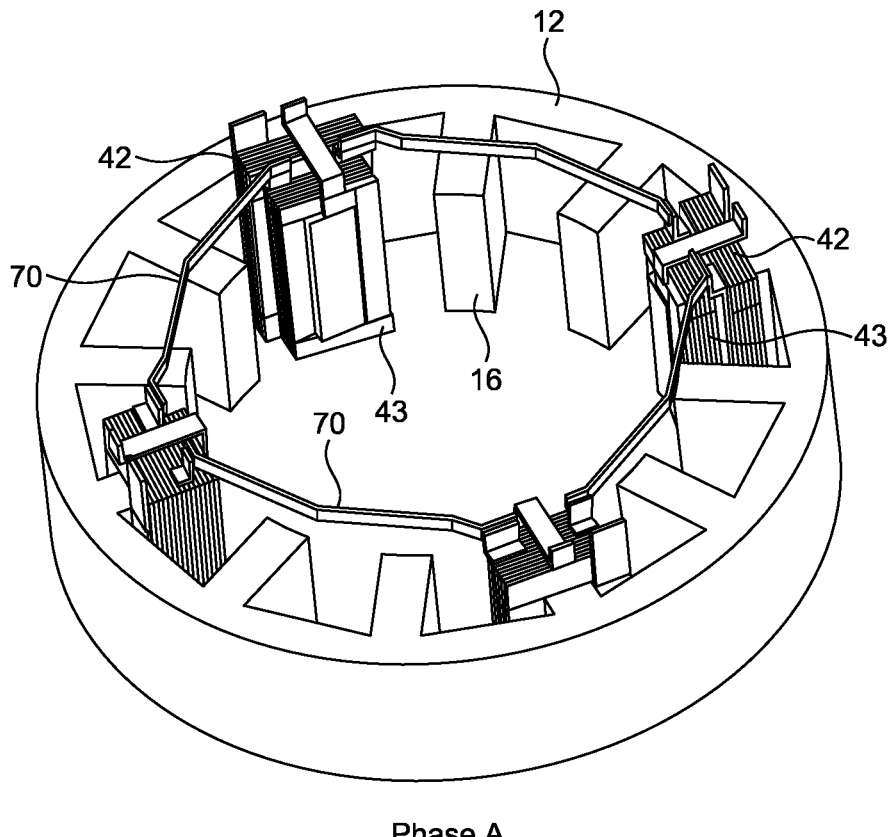
FIG. 14 shows a partially assembled stator with the coils of FIG. 13.

FIG. 14 shows a partially assembled stator with the coils of FIG. 13. In this configuration, the stator is for a three-phase, 12 slot, 8/16 pole machine (8 or 16 rotor poles). Successive teeth in a circumferential direction belong to different phases. Each tooth 16 carries a first, radially outwards coil 42 and a second, radially inwards coil 43 in the manner described above with reference to FIG. 13. In FIG. 14, the coils of one phase (Phase A) are shown on the teeth. In this configuration, the teeth of one phase are located at 90° intervals circumferentially about the stator.

Referring to FIG. 14, the output terminal of a first, radially outwards coil 42 on one tooth is connected via a connector 70 to the input terminal of a second, radially inwards coil 43 on a tooth located at a 90° interval. The connector 70 extends circumferentially around the stator, between the two coils. This pattern is repeated circumferentially around the stator. Thus, the terminals of the coils on one tooth are transposed connected with the coils on the tooth located at a 90° interval belonging to same phase. The terminals of other phases follow the same pattern.

Figure 15:
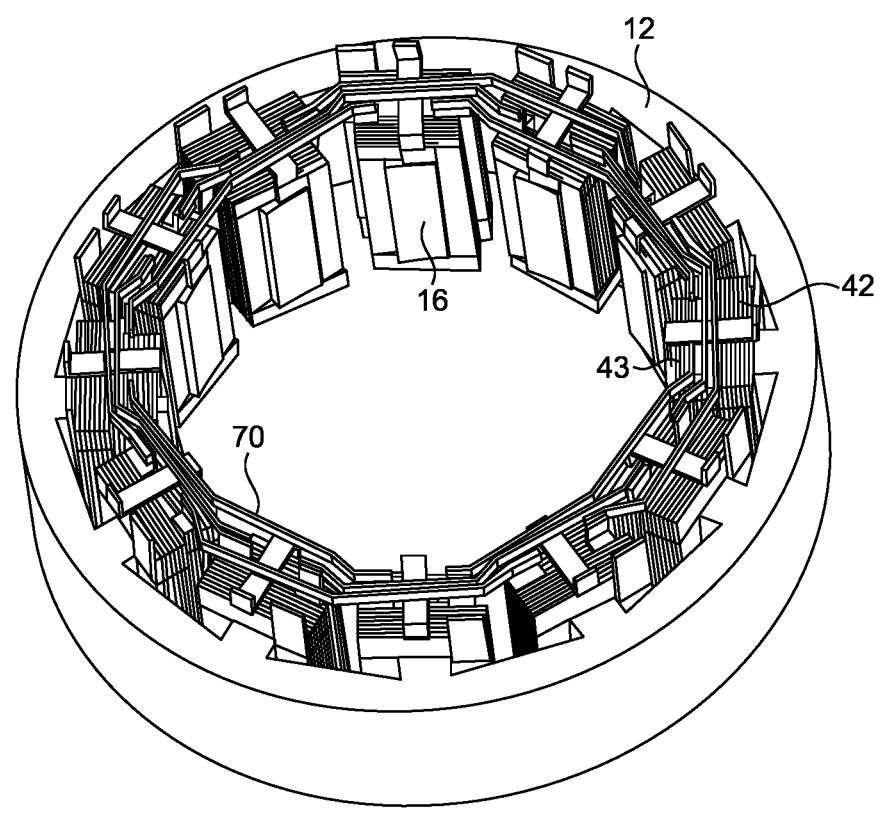
FIG. 15 shows the stator of FIG. 14 with the coils of three phases inserted onto the teeth.

FIG. 15 shows the stator of FIG. 14 with the coils of all three phases (Phases A, B and C) inserted onto the teeth. In this configuration, teeth belonging to one phase are located at 90° intervals in a circumferential direction about the stator. Successive teeth in a circumferential direction belong to different phases. The terminals of the coils on one tooth are transposed connected with the coils on the tooth located at a 90° interval belonging to same phase. By transposing the terminal connections of the flat rectangular wires, a balanced impedance between parallel wires can be achieved, reducing or eliminating the circulating current.

If desired, a connection ring could be used to connect the coils of the various teeth in the appropriate configuration. A suitable connection ring is, for example, that disclosed in International patent publication number WO 2013/076442, the subject matter of which is incorporated herein by reference, although any other suitable connection ring or other types of connector could be used instead.

Figure 16:
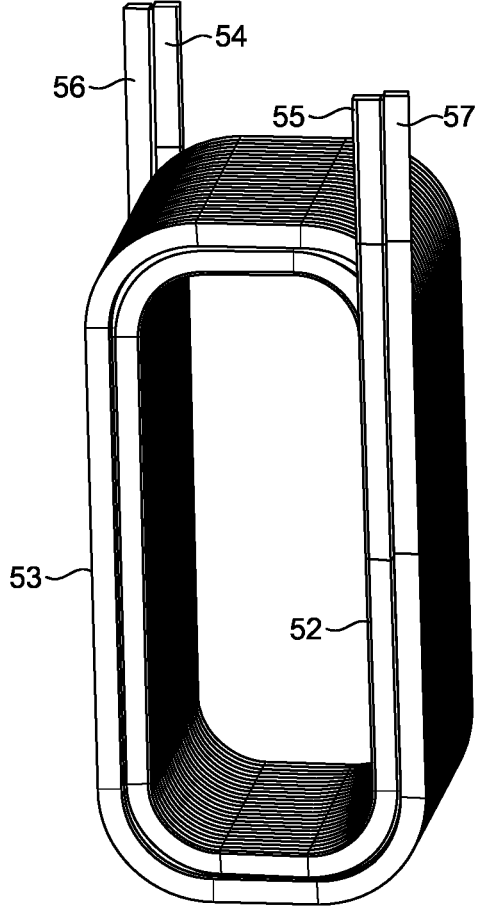
FIG. 16 shows the coils for a stator tooth in another embodiment of the disclosure.

FIG. 16 shows the coils for a stator tooth in another embodiment of the disclosure. In this embodiment, two coils are provided on each tooth, with one coil nested inside the other. Referring to FIG. 16, the coils comprise a first, inner coil 52 nested inside a second, outer coil 53. Each coil 52, 53 comprises a plurality of turns of flat, rectangular wire. The first, inner coil 52 comprises an input terminal 54 and an output terminal 55. The second, outer coil comprises an input terminal 56 and an output terminal 57. The two coils

52, 53 are pre-formed, and arranged to be slid onto the stator tooth. Each of the coils 52, 53 is of the same phase.

Figure 17:
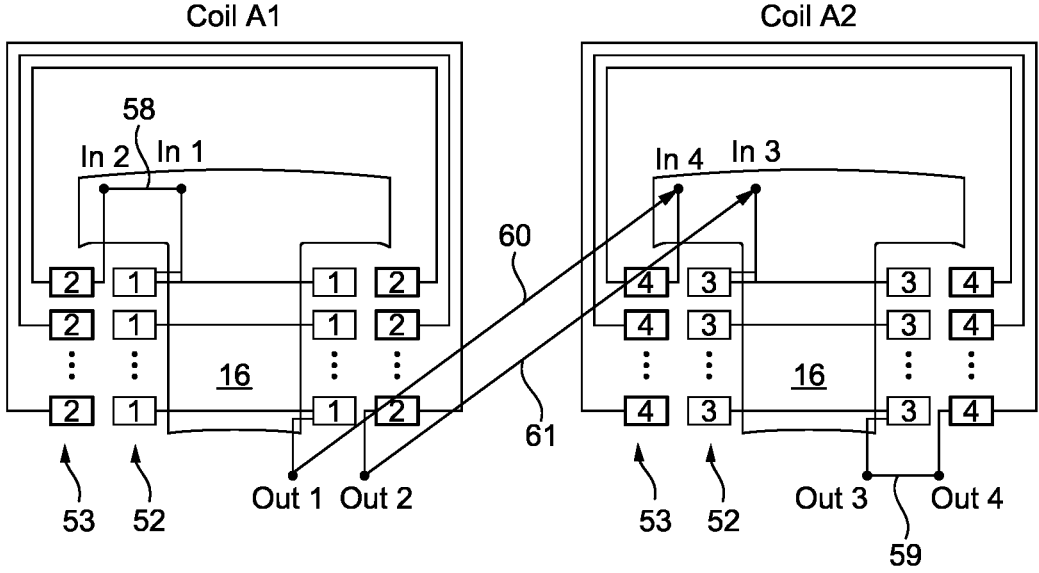
FIG. 17 shows a winding arrangement for use with the coils of FIG. 16.

FIG. 17 shows a winding arrangement for use with the coils of FIG. 16. For simplicity, only two teeth 16 are shown, but it will be appreciated that a plurality of stator teeth are provided circumferentially around an annular stator core. In the arrangement of FIG. 17, the input terminals of the two coils 52, 53 on the first tooth are connected together by a jump lead 58. Likewise, the output terminals of the two coils 52, 53 on the second tooth are connected together by a jump lead 59. The output terminal of the first, inner coil 52 on the first tooth 16 is connected to the input terminal of the second, outer coil 53 on the second tooth by a jump lead 60. Furthermore, the output terminal of the second, outer coil 53 on the first tooth 16 is connected to the input terminal of the first, inner coil on the second tooth by a jump lead 61. As a consequence, the inner coil on one tooth is connected in series with the outer coil on the other tooth, and the two pairs of series connected coils are connected in parallel. Thus, the terminals of the coils on one tooth are transposed connected with the coils on the adjacent tooth belonging to same phase. By transposing the terminal connections of the flat rectangular wires, the two parallel paths are distributed equally between inner coils and outer coils. As a consequence, the two parallel paths experience substantially the same magnetic flux during operation of the machine. This can allow a balanced impedance between the parallel paths to be achieved, reducing or eliminating the circulating current.

Figure 18:
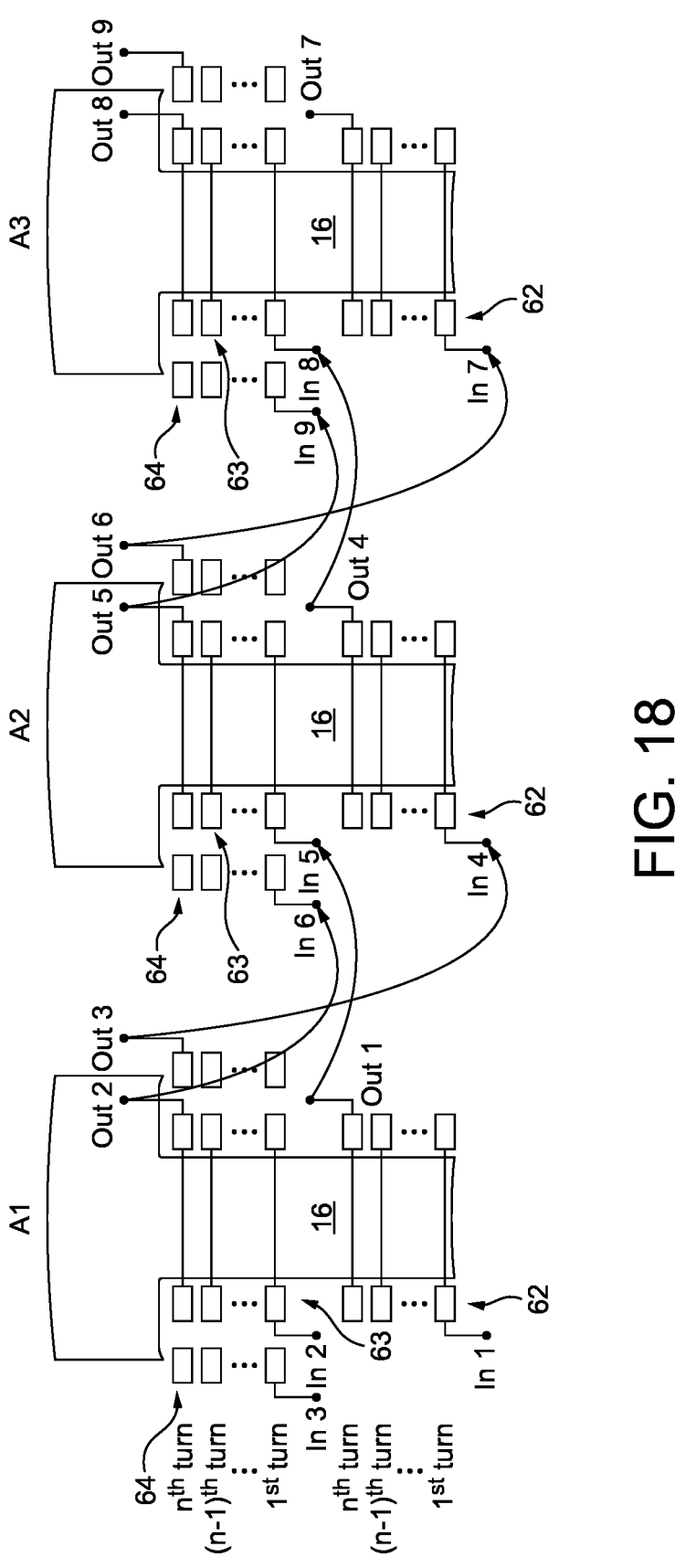
FIG. 18 shows a winding arrangement in another embodiment of the disclosure.

FIG. 18 shows a winding arrangement in another embodiment of the disclosure. In this embodiment, three coils are provided on each tooth. In FIG. 18, for simplicity, three adjacent stator teeth 16 are shown in a linear formation, but it will be appreciated that in practice a plurality of stator teeth are provided circumferentially around an annular stator core. Referring to FIG. 18, the radially inwards part of each stator tooth 16 (towards the slot opening) is wound with a single coil 62. On the other hand, the radially outwards part of each tooth 16 (towards the stator core) is wound with an inner coil 63 and an outer coil 64. Each coil 62, 63, 64 comprises a plurality of turns of flat, rectangular wire with an input terminal and an output terminal. The wires in each coil may have the same gauge, or a different gauge, and the gauge or gauges may be adjusted to suit the size of the slot. The coils 62, 63, 64 are pre-formed, and arranged to be slid onto the stator tooth. Each of the coils 62, 63, 64 is of the same phase. Since the radially outwards part of a tooth 16 is deeper inside the stator slot where the slot is wider, there is more space to accommodate the two nested coils. This arrangement can therefore allow more of the slot to be filled than would otherwise be the case. Furthermore, providing two coils on the radially outwards side of the tooth may allow better heat transfer from the coils through the stator to an external cooling jacket.

In the arrangement of FIG. 18, the output terminal of the radially inwards coil 62 on the first tooth A1 is connected to the input terminal of the inner coil 63 of the two nested coils on the radially outwards part of the second, adjacent tooth A2. The output terminal of the inner coil 63 on the radially outwards part of the first tooth A1 is connected to the input terminal of the outer coil 64 on the radially outwards part of the second tooth A2. The output terminal of the outer coil 64 on the radially outwards part of the first tooth A1 is connected to the input terminal of the radially inwards coil 62 of the second tooth A2. The output terminal of the radially inwards coil 62 on the second tooth A2 is connected to the input terminal of the inner coil 63 on the radially outwards part of the third tooth A3. The output terminal of the inner coil 63 on the radially outwards part of the second tooth A2 is connected to the input terminal of the outer coil 64 on the radially outwards part of the third tooth A3. The output terminal of the outer coil 64 on the radially outwards part of the second tooth A2 is connected to the input terminal of the radially inwards coil 62 of the third tooth A3.

Figure 19:
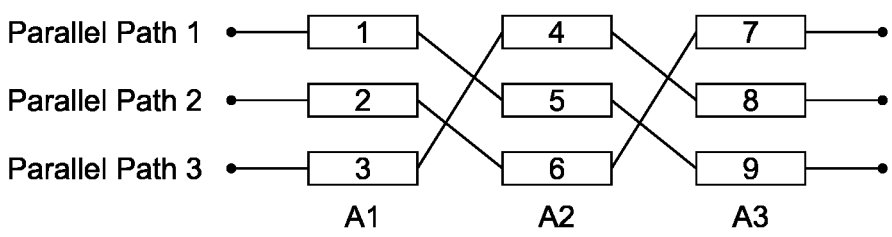
FIG. 19 illustrates the overall winding arrangement of FIG. 18.

FIG. 19 illustrates the overall winding arrangement of FIG. 18. As can be seen from FIGS. 18 and 19, the terminals of the coils on one tooth are transposed connected with the coils on the adjacent teeth belonging to same phase. By transposing the terminal connections of the flat rectangular wires, three parallel paths are distributed equally between radially inwards and radially outwards parts of the teeth and inner and outer coils. As a consequence, the three parallel paths experience approximately the same magnetic flux during operation of the machine. This can allow a balanced impedance between the parallel paths to be achieved, reducing or eliminating the circulating current.

Figure 20:
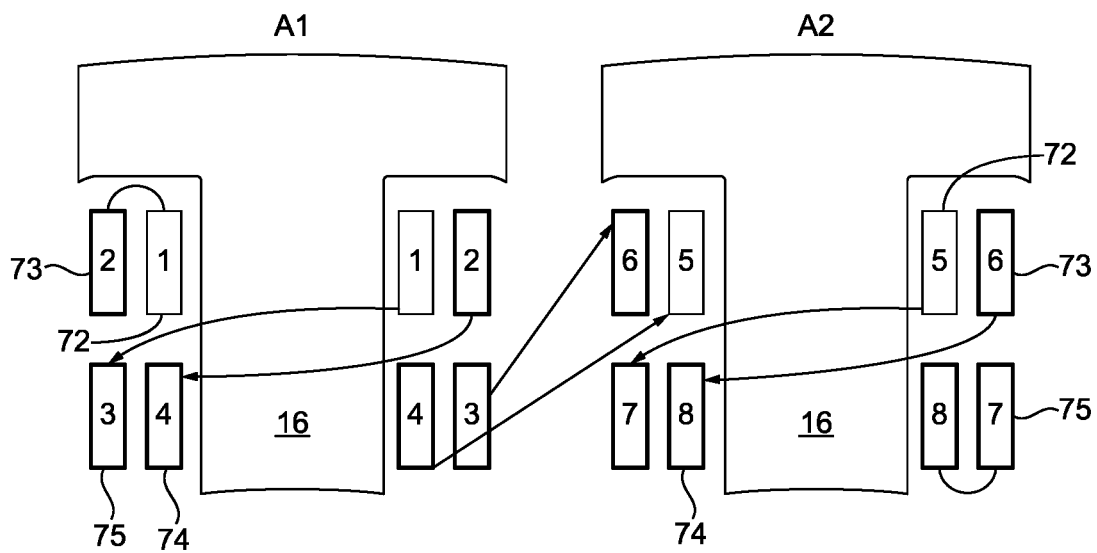
FIG. 20 shows a winding arrangement in a further embodiment of the disclosure.

FIG. 20 shows a winding arrangement in a further embodiment of the disclosure. In this embodiment, four coils are provided on each tooth. Referring to FIG. 20, the radially outwards part of each tooth 16 (towards the stator core) is wound with an inner coil 72 and an outer coil 73, in a similar manner to the embodiment of FIG. 18. However, in FIG. 20, the radially inwards part of each stator tooth 16 (towards the slot opening) is also wound with an inner coil 74 and an outer coil 75. As in the previous embodiments, each coil comprises a plurality of turns of flat, rectangular wire with an input terminal and an output terminal. The wires in each coil may have the same gauge, or different gauges. For example, the wires in the radially outwards coils may have a larger gauge than those in the radially inwards coils, to help with slot fill and heat transfer.

In the arrangement of FIG. 20, the input terminals of the inner coil 72 and the outer coil 73 on the radially outwards part of the first tooth A1 are connected together. The output terminal of the inner coil 72 on the radially outwards part of the first tooth A1 is connected to the input terminal of the outer coil 75 on the radially inwards part of the tooth. The output terminal of the outer coil 73 on the radially outwards part of the first tooth A1 is connected to the input terminal of the inner coil 74 on the radially inwards part of the tooth. The output terminal of the outer coil 75 on the radially inwards part of the first tooth A1 is connected to the input terminal of the outer coil 73 on the radially outwards part of the second, adjacent tooth A2. The output terminal of the inner coil 74 on the radially inwards part of the first tooth A1 is connected to the input terminal of the inner coil 72 on the radially outwards part of the second tooth A2. The output terminal of the inner coil 72 on the radially outwards part of the second tooth A2 is connected to the input terminal of the outer coil 75 on the radially inwards part of the tooth. The output terminal of the outer coil 73 on the radially outwards part of the second tooth A2 is connected to the input terminal of the inner coil 74 on the radially inwards part of the second tooth. The output terminals of the inner coil 74 and the outer coil 75 on the radially inwards part of the second tooth A2 are connected together.

Figure 21:
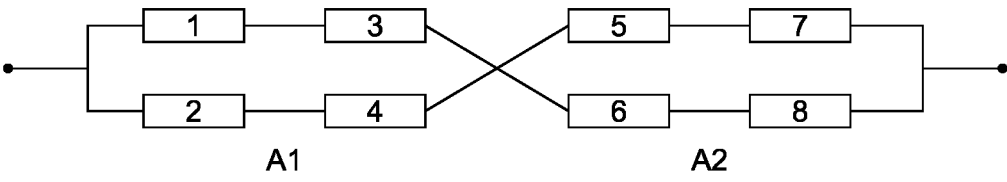
FIG. 21 illustrates the overall winding arrangement of FIG. 20.

FIG. 21 illustrates the overall winding arrangement of FIG. 20. As can be seen, the coils on one tooth are transposed connected with the coils on the adjacent tooth belonging to same phase. By transposing the terminal connections of the flat rectangular wires, the parallel paths are distributed equally between radially inwards and radially outwards parts of the teeth and inner and outer coils. As a consequence, the parallel paths experience substantially the same magnetic flux during operation of the machine. This can allow a balanced impedance between the parallel paths to be achieved, reducing or eliminating the circulating current.

It will be appreciated that, if desired, additional coils could be provided on the teeth. For example, each tooth could have three nested coils on the radially outwards part of the tooth and two nested coils on the radially inwards part of the tooth, or three nested coils on the radially outwards part of the tooth and three nested coils on the radially inwards part of the tooth, or any other number. In general, each tooth may comprise any number of coils in any configuration, with the appropriate transpose connections to balance the impedances.

In the various embodiments described above, coils on one tooth are transposed connected with coils on another tooth belonging to the same phase. This can help to ensure that the impedance of each parallel path is substantially the same. This can help prevent circulating currents between the parallel paths, thereby reducing AC losses and helping with thermal management.

Embodiments of the disclosure have been described above by way of example only, and modification in detail are possible. For example, at least some of the benefits of the disclosure may be achieved with wires of a different cross section, such as round wire, hexagonal wire, or any other suitable shape. If desired, the wires of different coils may be interleaved. The stator may comprise any appropriate number of teeth and the shape of the teeth and/or the slots may be varied as appropriate. The disclosure can also be applied to an electrical machine with an inner stator. The electrical machine may have any appropriate number of phases and the rotor may have any appropriate number of poles. Features of one embodiment may be used in combination with those of any other embodiment. Other modifications will be apparent to the skilled person within the scope of the claims.

What is claimed is:

1. A stator for a rotating electrical machine, the stator comprising a plurality of stator teeth wound with stator windings, wherein:

the plurality of stator teeth comprise at least a first tooth and a second tooth;

the stator windings on each tooth of the plurality of stator teeth comprise at least two parallel conductors, wherein the windings on each tooth comprise at least a radially outwards coil and a radially inwards coil of conductors; and the parallel conductors on one tooth of the plurality of stator teeth are transpose connected with the parallel conductors on another tooth of the plurality of stator teeth, wherein a radially outwards coil wound around the first tooth is connected in series with a radially inwards coil wound around the second tooth, and a radially inwards coil wound around the first tooth is connected in series with a radially outwards coil wound around the second tooth.

2. The stator according to claim 1, wherein the windings on each tooth comprise a first conductor in a first position relative to the tooth and a second conductor in a second position relative to the tooth, and a first conductor on one tooth is connected in series with a second conductor on another tooth, and vice versa.

3. The stator according to claim 1, wherein each conductor of the at least two parallel conductors on one tooth is connected in series with a conductor of the at least two parallel conductors on another tooth to form a plurality of parallel paths.

4. The stator according to claim 3, wherein the conductors are connected such that each parallel path of the plurality of parallel paths has substantially the same impedance.

5. The stator according to claim 3, wherein the conductors are connected so as to minimize circulating currents between the parallel paths.

6. The stator according to claim 1, wherein the teeth whose parallel conductors are transposed connected are of the same phase.

7. The stator according to claim 1, wherein each conductor of the at least two parallel conductors is a wire with a rectangular cross-section.

8. The stator according to claim 7, wherein the rectangular cross-section of the wire has an aspect ratio of at least 2:1.

9. The stator according to claim 1, wherein each coil of the coils comprises a plurality of turns, and each turn of the plurality of turns comprises a single rectangular wire.

10. The stator according to claim 1, wherein each coil of the coils comprises an input terminal and an output terminal, and an output terminal on one coil of the coils is connected to an input terminal on another coil of the coils using a connector.

11. The stator according to claim 1, wherein the windings on each tooth comprise at least two coils in different positions on the tooth, and the coils on one tooth are transpose connected with the corresponding coils on another tooth.

12. The stator according to claim 1, wherein each coil of the coils comprises a rectangular wire, and the rectangular wire in the radially outwards coil is wider than the rectangular wire in the radially inwards coil.

13. The stator according to claim 1, wherein the windings on each tooth comprise an inner coil and an outer coil, and the inner coil is nested inside the outer coil.

14. The stator according to claim 1, wherein the windings on each tooth comprise two radially outwards coils, one nested inside the other, and one radially inwards coil.

15. The stator according to claim 14, wherein the coils of three teeth belonging to the same phase are transpose connected.

16. The stator according to claim 1, wherein the windings on each tooth comprise two radially outwards coils, one nested inside the other, and two radially inwards coils, one nested inside the other.

17. A stator for a rotating electrical machine, the stator comprising a plurality of stator teeth wound with stator windings, wherein:

the stator windings on each tooth of the plurality of stator teeth comprise a radially inwards coil and a radially outwards coil connected in parallel; and the coils on one tooth are transpose connected with the corresponding coils on another tooth, wherein a radially outwards coil wound around the one tooth is connected with a radially inwards coil wound around the another tooth, and a radially inwards coil wound around the one tooth is connected with a radially outwards coil wound around the another tooth.

18. A method of winding a stator for a rotating electrical machine, the stator comprising a plurality of stator teeth, the method comprising:

winding each tooth of the plurality of stator teeth with at least two parallel conductors; and transpose connecting the parallel conductors on one tooth of the plurality of stator teeth with the parallel conductors on another tooth of the plurality of stator teeth by connecting a radially outwards coil wound around the one tooth with a radially inwards coil wound around the another tooth, and connecting a radially inwards coil wound around the one tooth with a radially outwards coil wound around the another tooth.

* * * * *